United States Patent Office 3,096,361
Patented July 2, 1963

3,096,361
PRODUCTION OF NITRILES FROM ALCOHOLS
Joachim Datow and Karl Wimmer, Ludwigshafen (Rhine), Germany, assignors to Badische Anilin- & Soda-Fabrik Aktiengesellschaft, Ludwigshafen (Rhine), Germany
No Drawing. Filed June 14, 1960, Ser. No. 35,883
Claims priority, application Germany June 19, 1959
5 Claims. (Cl. 260—465)

This invention relates to a process for the production of nitriles from alcohols and ammonia under simultaneously dehydrating and dehydrogenating conditions. More particularly, this invention relates to a process for the production of nitriles from alcohols and ammonia in the presence of catalysts which have not heretofore been used in this reaction.

Several methods are known for the production of nitriles by reacting alcohols with ammonia at elevated temperature in the presence of solid catalysts. The reaction may be represented by the following equation:

$$R\text{---}CH_2OH + NH_3 \rightarrow R\text{---}C\equiv N + H_2O + 2H_2$$

The conventional methods differ mainly in the kind of catalyst used. Thus, for example, the use of zinc sulfide as a catalyst has been described. In this process, however, the yields are unsatisfactory. Moreover, the catalyst cannot be regenerated in a simple way but must be given a new zinc sulfide coating. Thus, in practice, regeneration amounts to a replacement of the catalyst.

Zinc oxide has also been recommended as a catalyst for the said reaction, but here again the space-time yields are unsatisfactory, especially in the case of higher alcohols. The same disadvantage is encountered with catalysts consisting mainly of iron and/or iron oxides. The use of molybdenum oxide gives only unsatisfactory yields, even with relatively small space velocities.

The term-space yield is meant to denote the yield, given in terms of weight, of the reaction product per unit of reaction space and time. The term space velocity or specific throughput indicates the throughput of starting material (expressed in weight units) per unit of reaction space and time.

Finally, it is also known to carry out the said reaction in the presence of catalysts which consist mainly of silver or copper. These catalysts have the same disadvantage as those which contain as the essential components copper, chromium oxide, activated aluminum oxide and a basic alkali or alkaline earth compound (United States patent specification No. 2,795,600). While it is true that they give good yields and good space-time yields, they rapidly lose their activity and must be regenerated after only a few hours; this is very troublesome when carrying out the process on a commercial scale.

It is an object of this invention to provide a process for the production of nitriles from alcohols and ammonia in which high space velocities and high space-time yields are achieved. It is another object of this invention to provide a catalytic process for the production of nitriles from alcohols and ammonia in which long operational periods are possible without it being necessary to regenerate the catalysts. It is a further object of this invention to provide catalysts for the conversion of alcohols and ammonia into nitriles which can, if necessary, be easily regenerated.

According to the invention these objects and advantages are achieved by reacting primary alcohols with ammonia at an elevated temperature in the presence of a solid oxide catalyst, the active ingredients of which comprise as essential components chromium (III) oxide and a metal oxide selected from the group consisting of magnesium oxide, zinc oxide and cadmium oxide.

The new process combines the advantages of the prior art methods, i.e. high yields, high space velocities and long operational periods, without it being necessary to regenerate the catalyst. Furthermore the regeneration of the catalyst, when this is necessary, can be carried out in an especially simple way. It is surprising that the yields, in spite of the high space velocities should in some cases be even better than those obtained by the prior art methods. It is another advantage of the new catalyst that it is more stable to poisoning than the hitherto known catalysts.

The main ingredients of the catalysts, i.e. chromium (III) oxide and a metal oxide selected from the group consisting of magnesium oxide, zinc oxide and cadmium oxide may be deposited on carriers. Suitable carriers are all solid materials which do not react with an active ingredient of the catalyst, with the starting compounds or with the reaction products. The following carriers are given by way of example: silica gel, diatomaceous earth, pumice, charcoal, silicates and alumina. The proportion of active ingredients amounts, as a rule, to between 10 and 90% by weight with reference to the total weight of the catalyst.

It is, however, preferred to use the catalyst without a carrier. In this case the catalyst consists substantially of active ingredients. However, binding agents such as flake graphite or a binder of the type used in the manufacture of pellets, e.g. stearic acid or starch may be coemployed in the preparation of the carrier-free catalyst. The chromium content of the active ingredients in the catalyst is advantageously between 5 and 95%, preferably between 40 and 80% by weight, calculated as chromium (III) oxide. By the chromium (III) oxide content is meant the amount of this compound which can be determined analytically. Chromium (III) oxide may be contained in the catalyst as such and may be present in the form of $MeO \cdot Cr_2O_3$, Me representing a divalent metal. The chromium content is essential for the favorable qualities of the catalysts according to the invention. The remainder of the active ingredients of the carrier catalysts or of the carrier-free catalysts generally consists substantially of at least one other oxide compound which modifies the effectiveness of the chromium (III) oxide. Such compounds are, for example, metal oxides such as thorium oxide, zirconium oxide, titanium oxide, vanadium oxide, molybdenum oxide and tungsten oxide. Chromium (III) compounds which contain another metal oxide besides chromium (III) oxide are also suitable components for the catalysts in addition to chromium (III) oxide. Such chromium (III) compounds are, for example, zinc chromite, magnesium chromite, and cadmium chromite.

A large content of copper and/or silver in the catalysts should be avoided because they reduce the catalyst life. Thus, the amount of copper and/or silver should not exceed that of chromium (III) oxide. It is advantageous to use catalysts which are free from copper and/or silver or which contain only small amounts thereof, preferably less than 10% by weight, especially less than 5% by weight, with reference to the chromium (III) oxide. Small amounts of copper such as are sometimes to be found in the catlayst ingredients cause only negligible damage to the catalyst.

The catalysts may be prepared by kneading at least one suitable chromium compound, possibly together with one or more of the said oxidic additives, with water and with a small amount of a binding agent, such as flake graphite, shaping, drying and heating to a temperature which preferably lies between 200° and 400° C. Useful chromium compounds are, for example, chromium (III) oxide and chromium (III) compounds which form chromium (III) oxide when heated, such as chromium (III) hydroxide, chromium (III) sulfate and chromium (III) nitrate. It is preferable to start from chromium (VI) compounds which are substantially converted to chromium (III) oxide when heated to temperatures between 300 and 600° C. Such chromium (VI) compounds, are for example, chromium (VI) oxide, ammonium chromate and ammonium bichromate.

Carrier catalysts may be prepared by soaking the carrier material in an aqueous solution of at least one of the above-mentioned chromium compounds or mixing the solid chromium compound mechanically with the carrier and, if necessary, shaping the mixture. The carrier catalysts are then also heated to a temperature which preferably lies between 300° and 500° C. It is advantageous to treat both carrier catalysts and carrier-free catalysts with a current of hydrogen at a temperature between 200° and 600° C. before using them for the first time.

Saturated and unsaturated primary aliphatic and aralphatic alcohols may be reacted according to the process. Alcohols containing 3 to 20 carbons atoms are preferred. Especially good yields are achieved with initial materials which have about 6 to 20 carbon atoms. Among the alcohols which can be used there may be mentioned for example: propanol-(1), butanol-(1), 2-ethyl-butanol-(1), 2-ethyl-hexanol-(1), decanol-(1), tridecanol-(1), octadecyl alcohol, oleyl alcohol and benzyl alcohol. The primary alcohols described are of the formula $RCH_2OH$ wherein R is phenyl, alkyl of 2–19 carbons and alkenyl of 2–19 carbons. The mixtures of isomeric primary alcohols obtainable by the oxo synthesis are also suitable initial materials for the process.

The most favorable reaction temperatures lie between 350° and 500° C., especially between 380° and 450° C. Below 300° C. the reaction speed is too low, above 500° C. there is a risk of decomposition.

The new process is advantageously carried out continuously with rigidly arranged catalysts or by the fluidized layer method. In the former case the vaporous initial material is led together with ammonia, preferably in a mol ratio of 1:1 to 1:20, espeically 1:2 to 1:6, over the heated catalyst. The space velocity preferably amounts to between 0.2 and 2, advantageously between 0.6 and 1.2, kilograms of initial material per liter of catalyst per hour. As a rule atmospheric pressure is used. Increased pressures are recommendable in many cases, because they facilitate the separation of the reaction product from the gas stream by cooling. The nitrile formed is separated from water and if necessary distilled. In many cases, however, the crude products are so pure that a further purification is not necessary. The excess ammonia may be recycled.

When a loss in activitiy is observed, the catalyst can be regenerated in a simple way by leading air over it at a temperature between 400° and 600° C. A fresh treatment with hydrogen is not necessary.

The following examples will further illustrate this invention but the invention is not restricted to these examples. The parts, unless otherwise specified, are parts by weight. Parts by weight bear the same relation to parts by volume as the gram to the cc.

*Example 1*

400 parts of zinc oxide are mixed with 2100 parts of chromium (VI) oxide, 440 parts of water and 20 parts of flake graphite and kneaded to a paste. This is dried for 24 hours at 250° C. and heated for another 5 hours at 350° C. The coherent mass is comminuted to granules of from 3 to 6 mm. in width and heated for 3 hours in a current of hydrogen at 220° C.

Over the catalysts thus obtained there are led at 420° C. vaporous 2-ethyl-butanol and ammonia in the mol ratio 1:5 and with a space velocity of 0.632 part of 2-ethyl-butanol per part by volume of catalyst per hour. The reaction product is condensed in a cooler and the crude nitrile separated from water. 2-ethyl-butyronitrile is obtained in a yield of 85% of the theory. The boiling point is 144° to 148° C. at 760 mm. Hg abs. Analysis gives the following values: Found: C, 74.6; H, 11.3; N, 14.4. Calculated: C, 74.2; H, 11.3; N, 14.4.

After about 100 hours' use, the catalyst is heated to 450° C. in a current of air and can then be used again.

*Example 2*

For the preparation of the catalyst, 400 parts of zinc oxide, 2100 parts of chromium (VI) oxide, 440 parts of water and 20 parts of flake graphite are kneaded to a paste. The mixture is stirred with 800 parts of pumice with a granulation of 6 mm. so that the grains acquire a coating of the active composition. The catalyst is dried for 2 days at 260° C., then heated for 6 hours at 350° C. and heated for 3 hours in a current of hydrogen at 250° C.

A vaporous mixture of isomeric monyl alcohols (boiling point 197° to 202° C. at 760 mm. Hg abs.) with ammonia in the mol ratio 1:2 is led at a space velocity of 0.294 part of initial material per part by volume of catalyst per hour at 410° C. over the catalyst. The isomeric nonane nitriles are obtained in a yield of 91% of the theory. The boiling point is 92° to 100° C. at 20 mm. Hg abs. Analysis: Found: C, 78.1; H, 12.3; N, 10.0. Calculated: C, 77.6; H, 12.2; N, 10.1.

The catalyst is regenerated in the way described in Example 1 after it has been used for 95 hours.

*Example 3*

Vaporous primary tridecanols (an isomer mixture from the oxo synthesis) and ammonia in the molar ratio 1:5.4 are led at a space velocity of 1.0 part of initial material per part by volume of catalyst per hour at 420° C. over a catalyst consisting of 80% by weight zinc chromite and 20% by weight chromium oxide, said catalyst being prepared as described in Example 1. The isomeric tridecane nitriles are obtained in a yield of 95% of the theory. The boiling point is 135° to 142° C. at 15 mm. Hg abs. The analysis is as follows: Found: C, 80.6; H, 12.7; N, 6.7. Calculated: C, 80.0; H, 12.8; N, 7.2.

The catalyst is regenerated in the manner described above after it has been used for 100 hours.

*Example 4*

Benzyl alcohol and ammonia in the molar ratio 1:5.3 are led over the catalyst used in Example 1 at a space velocity of 0.61 part of benzyl alcohol per part by volume of catalyst per hour. The reaction temperature is 410° C. Benzonitrile is obtained in a yield of 90% of the theory. After use for 90 hours, the catalyst is regenerated in the manner described above.

*Example 5*

A vaporous mixture of technical oleyl alcohol and ammonia in the molar ratio 1:5.6 is led over the catalyst used in Example 3. The space velocity is 0.780 part of initial material per part by volume catalyst per hour, and the temperature is 420° C. Oleic acid nitrile is obtained in a yield of 89.3% of the theory. The analysis is: Found: C, 81.8; H, 12.9; N, 5.4. Calculated: C, 81.5; H, 13.2; N, 5.3.

*Example 6*

The catalyst described in Example 1 is used and 2-ethylhexanol and ammonia are reacted at 430° C. in the molar ratio 1:6.2 at a space velocity of 0.538 part of initial material per part by volume of catalyst per hour. 2-ethylhexane-nitrile is obtained in a yield of 86% of the theory, boiling point 66° to 68° C. at 10 mm. Hg abs. Anaylsis: Found: C, 77.1; H, 12.2; N, 11.1. Calculated: C, 76.8; H, 12.0; N, 11.2.

*Example 7*

500 parts of cadmium oxide are mixed with 1920 parts of chromium (VI) oxide, 400 parts of water and 20 parts of flake graphite and kneaded to a paste. This is dried for 29 hours at 250° C. and then heated for a further 5 hours at 450° C. The coherent mass is comminuted to granules measuring between 3 and 6 mm. and heated for 3 hours at 600° C. in a current of hydrogen.

Vaporous tridecanol and ammonia in the molar ratio 1:4 are led over the catalyst thus obtained at a space velocity of 0.725 part of tridecanol per part by volume of catalyst per hour. The reaction temperature is 410° C.

Tridecane nitrile is obtained in a yield of 95% of the theory. Analysis: Found: C, 79.7; H, 12.95; N, 6.95. Calculated: C, 80.0; H, 12.8; N, 7.18.

*Example 8*

13,160 parts of chromium (VI) oxide are kneaded to a paste with 5,360 parts of zinc oxide, 154 parts of graphite and 13,000 parts of water and the greater part of the water evaporated. The mixture in dried for 24 hours at 150° to 200° C. and then heated for a further 10 hours at 450° C. In this way zinc chromite is formed with the simultaneous splitting off of oxygen. The mass thus obtained is comminuted to granules measuring between 3 and 6 mm.

Vaporous tridecyl alcohol and ammonia in the molar ratio 1:3 are led at 400° C. over the catalyst thus obtained at a space velocity of 1.1 parts of tridecyl alcohol per part by volume of catalyst per hour. Tridecane nitrile is obtained in a yield of 91% of the theory. Anaylsis: Found: C, 80.7; H, 11.65; N, 7.31. Calculated: C, 80.0; H, 12.82; N, 7.18.

The catalyst can be regenerated in the conventional manner.

What we claim is:

1. A process for the production of nitriles of the formula R—CN which comprises reacting a primary alcohol of the formula $RCH_2OH$ wherein R in the foregoing formulae is a member selected from the group consisting of phenyl, alkyl of 2-19 carbons and alkenyl of 2-19 carbons with ammonia at a temperature in the range of 300-500° C. in contact with a solid catalyst consisting essentially of the active ingredients chromium (III) oxide and a member selected from the group consisting of zinc oxide and cadmium oxide wherein the chromium content of said catalyst, calculated as chromium (III) oxide, constitutes 5-95% by weight of said active ingredients.

2. A process as claimed in claim 1 wherein said chromium content of said catalyst, calculated as chromium (III) oxide, constitutes 40-80% by weight of said active ingredients.

3. A process as claimed in claim 2 wherein the space velocity of the reactant materials lies between about 0.2 and 2 kg./liter of catalyst/hour.

4. A process as claimed in claim 2 wherein said temperature is 380-450° C.

5. A process as claimed in claim 1 wherein the mole equivalents ratio of said ammonia to said primary alcohol lies between about 1:1 and 20:1.

References Cited in the file of this patent

UNITED STATES PATENTS

| | | |
|---|---|---|
| 2,337,421 | Spence et al. | Dec. 21, 1943 |
| 2,337,422 | Spence et al. | Dec. 21, 1943 |
| 2,443,420 | Gresham | June 15, 1948 |
| 2,452,187 | Gresham | Oct. 26, 1948 |
| 2,487,299 | Bishop | Nov. 8, 1949 |
| 2,644,834 | Max | July 7, 1953 |
| 2,795,600 | Chitwood et al. | June 11, 1957 |
| 2,805,243 | Noeske et al. | Sept. 3, 1957 |

OTHER REFERENCES

Bergmann: "Acetylene Chemistry," page 80, 1948.

UNITED STATES PATENT OFFICE
CERTIFICATE OF CORRECTION

Patent No. 3,096,361 — July 2, 1963

Joachim Datow et al.

It is hereby certified that error appears in the above numbered patent requiring correction and that the said Letters Patent should read as corrected below.

Column 4, line 17, for "monyl" read -- nonyl --.

Signed and sealed this 25th day of February 1964.

(SEAL)
Attest:
ERNEST W. SWIDER

Attesting Officer

EDWIN L. REYNOLDS

Acting Commissioner of Patents